United States Patent [19]

Cowlard

[11] Patent Number: 5,802,277
[45] Date of Patent: Sep. 1, 1998

[54] VIRUS PROTECTION IN COMPUTER SYSTEMS

[75] Inventor: James Cowlard, Erskine, Great Britain

[73] Assignee: International Business Machines Corporation, Armonk, N.Y.

[21] Appl. No.: 686,897

[22] Filed: Jul. 26, 1996

[30] Foreign Application Priority Data

Jul. 31, 1995 [GB] United Kingdom ............... 9515686

[51] Int. Cl.$^6$ .................................................. G06F 11/00
[52] U.S. Cl. ............................................................ 395/186
[58] Field of Search ............................ 395/186, 183.13, 395/183.12, 183.14; 380/3, 4; 364/222.5, 286.4, 918.7

[56] References Cited

U.S. PATENT DOCUMENTS

| | | | |
|---|---|---|---|
| 4,975,950 | 12/1990 | Lentz | 380/4 |
| 5,121,345 | 6/1992 | S.A. Lentz | 364/550 |
| 5,359,659 | 10/1994 | Rosenthal | 380/4 |
| 5,361,359 | 11/1994 | Tajalli et al. | 395/700 |
| 5,367,682 | 11/1994 | Chang | 395/700 |
| 5,398,196 | 3/1995 | Chambers | 364/580 |
| 5,440,723 | 8/1995 | Arnold et al. | 395/181 |
| 5,452,442 | 9/1995 | Kephart | 395/183.14 |
| 5,475,839 | 12/1995 | Watson et al. | 395/650 |
| 5,509,120 | 4/1996 | Merkin et al. | 395/186 |
| 5,511,163 | 4/1996 | Lerche et al. | 398/183.04 |

OTHER PUBLICATIONS

Symantec, "Anti-Virus NLMs", PC User, n238, p. 108(16), Jun. 1994.

Freeman, "In Sickness and in Health", Lan Magazine, v10, n3, p. 111 (5), Mar. 1995.

Chowning, "IBMs Antivirus Solution For Client/Server Environments" Data Based Advisor, v12, n12, p. 54 (4), Dec. 1994.

Conover, "Security Vendors Put Virus Protection in the Network Hardware" v6, n6, p. 106 (3), May 1995.

IBM Technical Disclosure Bulletin, vol. 34, No.2, p. 150–154, Nov. 1991.

*Primary Examiner*—Robert W. Beausoliel, Jr.
*Assistant Examiner*—Stephen C. Elmore

[57] ABSTRACT

A method and apparatus for preventing the virus infection of computer systems from a diskette carrying a boot sector virus. System ROM code in the computer system includes a routine that is executed before passing control to a bootable media. This routine is designed to execute when Power On Self Test has completed and the boot record from the bootable media, either hardfile or diskette, has been loaded into system memory. The boot record is scanned for the presence of known boot sector viruses, signatures of which are stored in FLASH ROM within the computer system.

8 Claims, 2 Drawing Sheets

VIRUS PROTECTION IN COMPUTER SYSTEMS

FIELD OF THE INVENTION

The present invention relates to a method and apparatus for protecting a computer system against computer viruses, in particular against boot sector viruses.

BACKGROUND OF THE INVENTION

One important challenge facing the computer industry is preventing the spread and effect of computer viruses. A large variety of different viruses have been devised which when present on an infected system can cause problems of varying degree. One known type of virus operates to destroy the contents of the system hard file thereby causing the system to become completely inoperable. If the infected computer system is part of a network of computer systems then, unless security methods are provided in the network, the virus can be transmitted between systems on the network causing widespread loss of user data and software. In serious cases, the virus can disrupt user data in a database without leaving evidence of such disruption. As can be readily imagined, if data is rendered inaccurate by this latter kind of virus infection, serious consequences can ensue for organizations such as banks and hospitals.

A large number of different anti-virus techniques have been proposed for tackling this problem. In one prior art anti-virus method, programs to be executed on a computer system first undergo a self-test to determine whether the program has been modified. In another prior art technique, predefined characteristics (e.g., checksum) of each program in its uninfected state are stored. Before each program is executed, these characteristics are regenerated and compared with the stored counterparts to determine whether the program has been modified.

Although the above described and similar techniques provide useful protection, they are unsatisfactory in that they generally rely on the assistance of the computer's operating system. Since the operating system can only function after the computer system has been successfully booted, these prior art methods cannot protect the computer from viruses that attack when a computer system boots i.e., before installation of the computer operating system.

One particular type of infection against which these methods do not provide protection is infection by boot sector virus. This form of virus is directed at the boot sector of a bootable medium e.g., hardfile or diskette. Since the boot sector is the first item of data in any 'boot up' of a disk-resident computer system, a virus in that location is virtually without defense. Checksum approaches have been employed in respect of boot programs stored on the system hardfile, but this approach is not effective when booting from a diskette, for which there may be no checksum value stored in the computer system.

When a diskette, infected with a boot sector virus, is placed into a computer system and that system is allowed to boot, the virus operates to transfer itself from the diskette to the system hardfile. This transfer is generally effected when control of the system is passed to an infected boot record on the diskette. At this point, the virus transfer code which is in that boot record executes. The first action taken is to hook the Interrupt 13h vector which controls the hardfile/diskette access. This hook inserts a piece of code which will be executed during all Int 13h routines and will cause the boot record of any devices accessed to be updated with the virus code. The hook remains in memory throughout the time that the computer system is powered on and will reinstall itself from the boot record when the system is rebooted (either by powering up or by means of ALT-CTRL-DEL). By this mechanism, the system hardfile becomes permanently infected with that boot sector virus and even if there is a virus detection facility installed on the system hardfile, it will be powerless to prevent infection taking place. In addition, no knowledge of the transfer will be flagged and the infected diskette may well be inadvertently used on further computer systems.

One device on the market which purports to provide protection against infection from infected diskettes is the McAfee ROMSHIELD (this term is a trademark relating to an integrated circuit device which attempts to detect boot sector viruses) chip which is designed to fit into the boot ROM socket found on most Ethernet LAN adapters. As described in the product literature, the ROMSHIELD (this term is a trademark relating to an integrated circuit device which attempts to detect boot sector viruses) chip automatically scans every diskette inserted into the computer for boot sector viruses before the diskette is accessed. Although this device appears to provide protection against such viruses, it suffers from the disadvantage that it relies on the provision of additional hardware in the system i.e., a LAN adapter, which will not generally be present in standalone systems, and on additional ROM, thereby adding to the cost of the computer system.

SUMMARY OF THE INVENTION

There is therefore a need for an improved technique which provides protection against infection by a boot sector virus from a bootable medium and which is capable of providing protection against infection by a boot sector virus on a diskette in a diskette drive.

Viewed from a first aspect, the invention provides a method for preventing the transfer of boot sector viruses to a computer system having a processor and memory in which is stored system microcode that is executed by the processor to initialize the system on system power-up and in which is further stored virus detection code, the system being operable after the system initialization to load a system boot program from a bootable media, the method comprising: upon completion of system initialization, loading the boot program from the bootable media into system memory; prior to execution of said boot program, executing said virus detection code to check said stored boot program for the presence of computer viruses; and issuing a warning to the user of the computer system on a determination that the boot program includes a computer virus.

Viewed from a second aspect, the invention provides a computer system comprising a processor and read-only memory for storing system microcode that is executed by the processor to initialize the system on system power-up and for further storing virus detection code, the system being operable, on completion of the initialization procedure to load a boot program from a bootable medium into system memory, the system being further operable, prior to execution of the loaded boot program, to check, by means of the virus detection code executing on said processor, the boot program for computer viruses and to issue a warning to a user of the computer system on a determination that a computer virus has been detected.

In a preferred embodiment of the invention, execution of the boot program is prevented on detection of a computer virus. However in some computer systems, this may not be necessary. In one possibility, the user might be given the option of booting from the infected medium. In another possibility where the computer system includes an effective anti-virus program on the hard file and the system is informed that the detected virus is not immediately destructive, the system may be allowed to boot automatically from the infected medium—the antivirus program being used to clean up the infected medium.

There are a number of ways in which the virus detection code can operate to detect the presence of computer viruses. One possible approach would be non-signature based heuristic analysis of the boot record wherein 'fuzzy logic' is employed to detect viruses. However, in a preferred system and method according to the present invention, virus signatures are stored in system memory along with the virus detection code. The presence of computer viruses is checked by comparing the boot record with the virus signatures.

Advantageously, the virus detection code and virus signatures are stored in the same read-memory in which is stored the system microcode (i.e., BIOS and POST). In this manner, protection against infection from infected media is achieved without the need for additional hardware in the computer system.

Although the technique of the present invention is effective against virus infection from all types of bootable media, it will be appreciated that it is especially adapted to counter attack from infected diskettes, which problem is not generally susceptible to the known checksum approach described above.

Although the virus detection code and virus signatures can be stored in read-only memory, it is preferred that they are stored in programmable read-only memory in order to allow updates to the virus detection code and/or the signatures, in order to ensure detection of different viruses as they are developed.

BRIEF DESCRIPTION OF THE DRAWINGS

A preferred embodiment of the invention will now be described, by way of example only, with reference to the accompanying drawings in which.

DETAILED DESCRIPTION OF THE INVENTION

Figure 1:
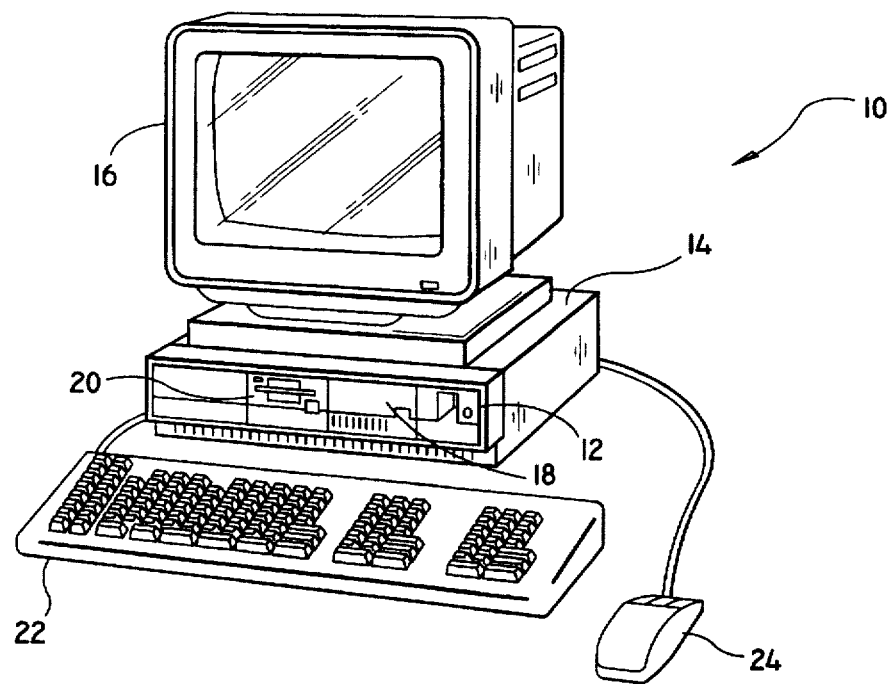
FIG. 1 shows a computer system incorporating the present invention.

Referring to FIG. 1, there is shown a personal computer system 10 which embodies the present invention. The personal computer system includes a system unit 12 having a suitable enclosure or casing 14, an output device in the form of a video display 16 and input devices in the form of a keyboard 22 and a pointing device such as a mouse 24. Finally the system unit includes one or more mass storage devices such as a diskette drive 20 and a hard disk drive (hardfile) 18.

Figure 2:
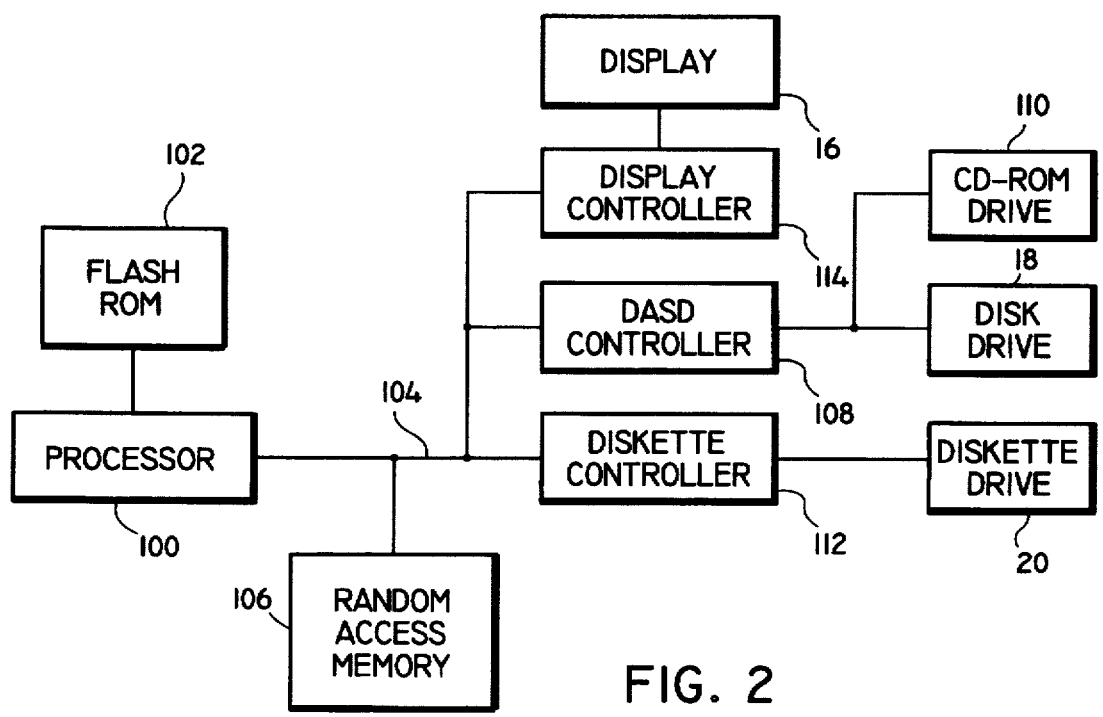
FIG. 2 is a block diagrammatical representation of the major components of the system of FIG. 1.

Referring now to FIG. 2, there is shown a schematic block diagram indicating the electronic interconnection of the components making up the computer system of FIG. 1. System unit includes a main processor or CPU 100 connected to read only memory (ROM) 102 which contains the BIOS and POST programs. POST is the set of instructions which execute when the system is first powered on to initialize the personal computer system. BIOS is the set of instructions which facilitate the transfer of data and control instructions between the processor and I/O devices. Processor is also connected, via bus 104 to a plurality of subsystems. Bus 104 may be any one of a number of known bus types (e.g. PCI, VL-Bus). Connected on the bus is Random access memory (RAM) 106 which is provided for the storage of programs and data. Direct access storage device (DASD) 108 controller provides the interface and connection to the hard disk drive 18. DASD controller may also control the operation of other devices such as a CD ROM drive 110. Diskette controller 112 provides the interface and connection to the diskette drive 20. Also shown in FIG. 2 is display controller 114 which controls the operation of video display 16.

Figure 3:
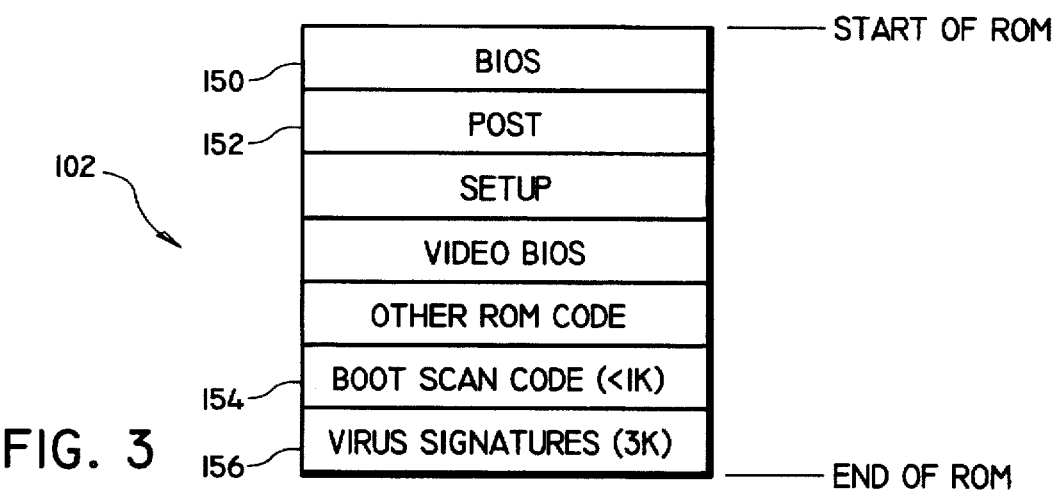
FIG. 3 is a schematic representation of the system ROM of FIG. 2, indicating the boot scan code and virus signatures.

The normal system boot procedure will now be described, followed by a description, with reference to FIGS. 3 and 4, of the manner in which this procedure is enhanced to effect virus protection according to a preferred embodiment of the present invention.

The computer system of FIGS. 1 and 2 is rebooted either by powering up the system or by invoking the ALT-CTRL-DEL reboot procedure. In both cases, the processor performs a Power On Self Test (POST) by executing POST code which is stored in ROM along with the system BIOS. If there is no error in POST, a boot program is loaded into the computer system from the booting device which is normally the hard disk or the diskette. This boot program is responsible for beginning the load of an operating system from one of a plurality of partitions on the disk, and, in the case of a hardfile, includes two components, a program code component and a partition table data component. If the boot program executes without error, the operating system (e.g. PC DOS) is loaded, with reference to the partition table which identifies the location of the software components of the operating system.

As has been described in the introductory section of the present application, if no preventative measures are taken, a boot sector virus on the boot device affects the computer system by replacing the boot program with a virus program at boot time to control the system. Thus after completion of POST when the boot program is loaded into system memory, the virus transfer code which is in that boot record executes and hooks the Interrupt 13h vector which controls hardfile/diskette access.

Next will be described the system and method by means of which a boot sector virus is detected prior to infection of the computer system. FIG. 3 shows the memory map of FLASH ROM 102. In addition to the BIOS 150 and POST 152 components, there is stored boot scan code 154 and virus signatures 156, which operate on the computer system to detect boot sector viruses on the bootable medium. As the name suggests, a virus signature is a sequence of bytes which is found in a particular virus and which identifies that virus uniquely. The virus signatures stored in ROM are each typically approximately twelve to twenty bytes in length. It should be noted that both the boot scan code and the virus signatures may be located anywhere within the system ROM space.

Figure 4:
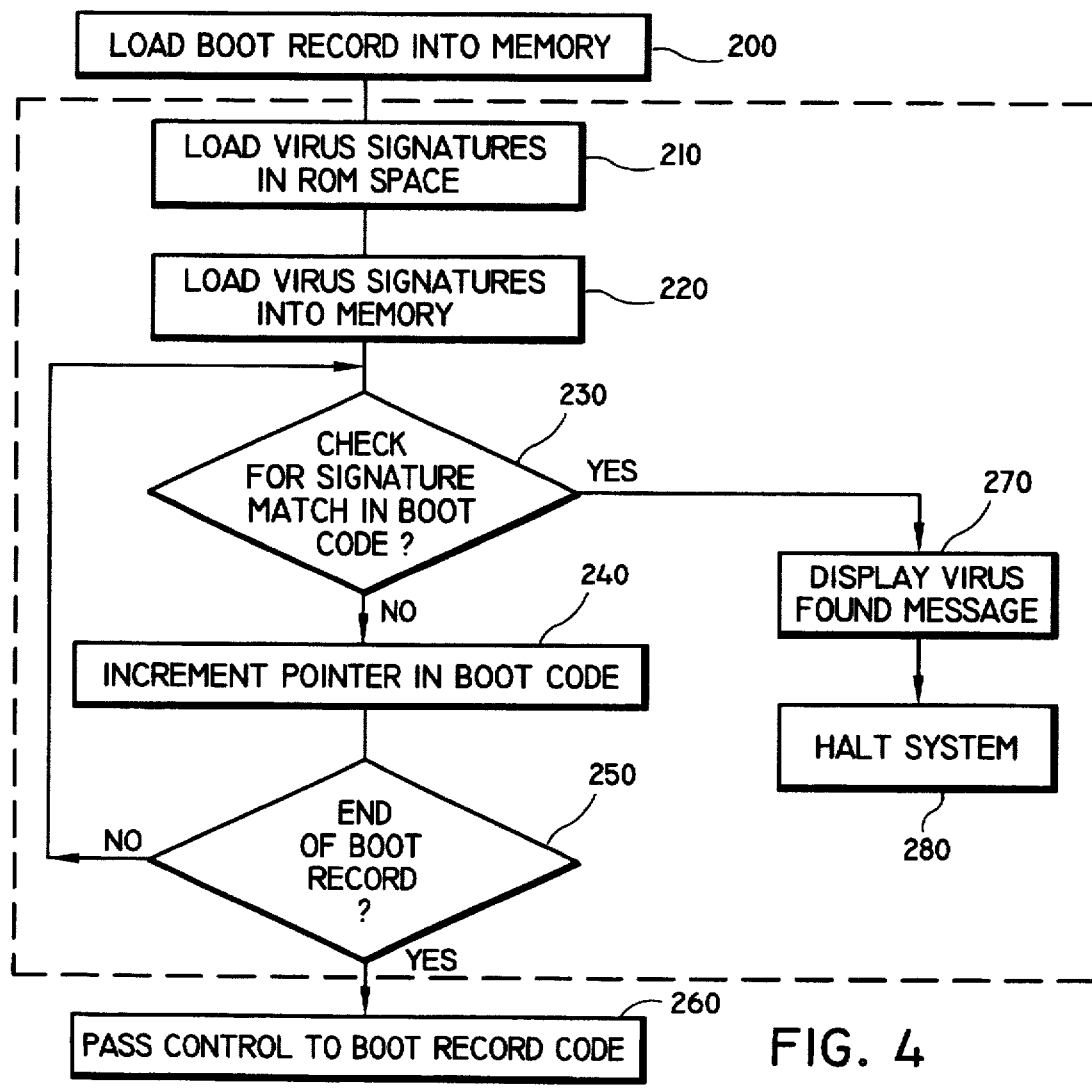
FIG. 4 is a flow chart indicating the virus detection method of the preferred embodiment of the present invention.

FIG. 4 shows the steps carried out to detect the presence of a boot sector virus in the boot record of a diskette loaded in the diskette drive 20. The portion of the flowchart enclosed by a dotted line represents the additional steps of the virus detection technique. After completion of POST, the boot record from the bootable media is loaded (step 200) into system memory. The boot scan code is then invoked to locate (step 210) the virus signatures in ROM space and to load (step 220) those virus signatures into memory. The boot code is then compared with the virus signatures on a byte by byte basis—in step 230, the first predefined number of bytes of the boot code are checked against each of the virus signatures to see if there is a match. If not, the pointer to the boot code is incremented in step 240. On a determination in step 250 that the end of the boot code has been reached without uncovering a boot sector virus, control is then passed to the boot code (step 260) and the system boot continues as described above.

If however in step 230 a match is found between the boot code and a virus signature, the boot operation is halted and a warning is conveyed to the system user e.g. by display of a warning message (step 270). The system is halted in step 280.

Corrective action can take a number of different forms. In the case of an infected diskette, the diskette can simply be replaced and the system restarted. In the case of an infected hardfile, the normal fix would be to boot from a clean diskette and then to use an antivirus program (from the hardfile or the diskette) to clean up the hardfile. In extreme cases, recovery may involve the reformatting of the hardfile and replacement of the boot record and operating system code.

In view of the dynamic nature of the field of computer viruses, the virus signatures are advantageously stored in FLASH ROM in order to allow for field updates to the list of virus signatures as necessary. As it is currently common practice in personal computers to store system BIOS in FLASH ROM to allow for updates, the virus signatures may be stored in the same physical memory. In the case where BIOS is stored in ROM, then the virus signatures could be stored in separate FLASH ROM.

From the above description, it will be apparent that one further advantage of the present invention arises from the association of the virus detection code with the system BIOS. The system BIOS knows what boot record is actually going to be booted from—techniques employing the ROM-SHIELD (this term is a trademark relating to an integrated circuit device which attempts to detect boot sector viruses) chip described above need to search for all the components of the system which might be boot records and to hope that it actually checks the component from which the BIOS actually boots.

I claim:

1. A method for preventing the transfer of boot sector viruses to a computer system having a processor and memory in which is stored system microcode that is executed by the processor to initialize the system on system power-up and in which is further stored virus detection code, the system being operable after the system initialization to load a system boot program from a removable bootable media, the method comprising:

upon completion of system initialization, loading the boot program from the removable bootable media into system memory;

prior to execution of said boot program, executing said virus detection code to check said stored boot program for the presence of computer viruses, wherein the system memory includes virus signature data in addition to the virus detection code, said step of executing the virus detection code includes comparing the stored boot program with the virus signature data; and issuing a warning to the user of the computer system on a determination that the boot program includes a computer virus.

2. A method as claimed in claim 1, wherein the virus signature data comprises a sequence of bytes indicative of a particular computer virus and the step of comparing the boot program with the virus signature data comprises scanning the bytes of the boot record for the presence of said sequence of bytes of said virus signature data.

3. A method as claimed in claim 1, wherein said removable bootable medium is a diskette in a diskette drive of said system, the step of loading the boot program into system memory comprises transferring, into system memory, the boot program stored on said diskette.

4. A method as claimed in claim 1, comprising the further step of halting execution of the boot program on detection of a computer virus.

5. A computer system comprising a processor and read-only memory for storing system microcode that is executed by the processor to initialize the system on system power-up and for further storing virus detection code, the system being operable, on completion of the initialization procedure to load a boot program from a removable bootable medium into system memory, the system being further operable, prior to execution of the loaded boot program, to check, by means of the virus detection code executing on said processor, the boot program for computer viruses, the system memory further storing virus signature data, wherein the system is operable, by means of the virus detection code executing on the system processor, to compare the loaded boot program with the virus signature data in order to determine the presence of a computer virus, and the system being further operable to issue a warning to a user of the computer system on a determination that the computer virus has been detected.

6. A computer system as claimed in claim 5, wherein said read-only memory is programmable read only memory.

7. A computer system as claimed in claim 5, wherein said removable bootable medium is a diskette drive.

8. A computer system as claimed in claim 5, wherein said read-only memory is a FLASH ROM.

* * * * *